United States Patent
Dragan

(10) Patent No.: US 12,186,819 B2
(45) Date of Patent: Jan. 7, 2025

(54) COLLECTING SAWDUST AND OTHER DEBRIS FROM POWER SAWS

(71) Applicant: Mark J. Dragan, Lakeville, MN (US)

(72) Inventor: Mark J. Dragan, Lakeville, MN (US)

( * ) Notice: Subject to any disclaimer, the term of this patent is extended or adjusted under 35 U.S.C. 154(b) by 160 days.

(21) Appl. No.: 17/077,884

(22) Filed: Oct. 22, 2020

(65) Prior Publication Data
US 2021/0170511 A1 Jun. 10, 2021

Related U.S. Application Data

(63) Continuation of application No. 15/336,422, filed on Oct. 27, 2016, now abandoned.

(60) Provisional application No. 62/211,096, filed on Aug. 28, 2015.

(51) Int. Cl.
B23D 59/00 (2006.01)

(52) U.S. Cl.
CPC .................... B23D 59/006 (2013.01)

(58) Field of Classification Search
CPC ................ B23D 59/006; B23D 59/00
USPC ..................... 83/98, 100; 138/114
See application file for complete search history.

(56) References Cited

U.S. PATENT DOCUMENTS

| | | | | |
|---|---|---|---|---|
| 2,122,507 A * | 7/1938 | Ball | ........................ | B25D 9/14 125/6 |
| 2,130,232 A * | 9/1938 | Goodenough | ..... | B23Q 11/0046 175/209 |
| 3,076,737 A * | 2/1963 | Roberts | .................. | B29D 23/18 138/121 |
| 3,096,933 A * | 7/1963 | Bora | ...................... | F04D 29/646 417/247 |
| 3,321,871 A * | 5/1967 | Balamuth | ............... | B24B 53/00 451/28 |
| 3,401,724 A * | 9/1968 | Kreitz | ................ | B23Q 11/0046 83/859 |
| 3,460,294 A * | 8/1969 | Stumpf | ................... | B24B 55/06 451/456 |
| 3,934,618 A | 1/1976 | Henderson | | |
| 3,945,281 A | 3/1976 | Kreitz | | |
| 3,958,474 A * | 5/1976 | Kreitz | .................. | B23D 59/006 83/100 |
| 4,061,221 A * | 12/1977 | Higashinaka | ........ | B65G 69/186 141/93 |
| 4,109,144 A * | 8/1978 | Vidmar | .................. | B08B 15/002 362/427 |
| 4,144,781 A | 3/1979 | Kreitz | | |
| 4,255,995 A | 3/1981 | Connor | | |
| 4,367,665 A * | 1/1983 | Terpstra | ............... | B23D 59/006 83/167 |
| 4,576,072 A * | 3/1986 | Terpstra | ............. | B23Q 11/0046 83/100 |
| 4,596,060 A * | 6/1986 | Schmidt | .................. | B08B 15/04 15/301 |
| 4,934,233 A | 6/1990 | Brundage et al. | | |

(Continued)

*Primary Examiner* — Adam J Eiseman
*Assistant Examiner* — Richard D Crosby, Jr.
(74) *Attorney, Agent, or Firm* — Christensen, Fonder, Dardi & Herbert, PLLC.; Timothy J. Busse; Douglas J. Christensen

(57) ABSTRACT

An apparatus that may be attached between a five gallon bucket and a power saw so that debris generated by the power saw is collected in the five gallon bucket. The power saw may be one of a plurality of compatible power saws. The apparatus including a debris conduct, a duct and a skirt disposed about an upstream edge of the duct.

20 Claims, 14 Drawing Sheets

(56) References Cited

U.S. PATENT DOCUMENTS

| | | | |
|---|---|---|---|
| 5,445,056 A * | 8/1995 | Folci | B23D 59/006 83/100 |
| 5,491,870 A * | 2/1996 | Holmes | A47L 7/009 15/301 |
| 5,594,972 A * | 1/1997 | Iversen | B24B 55/06 15/301 |
| 5,600,752 A | 2/1997 | Lopatinsky | |
| 5,782,153 A | 7/1998 | Sasaki et al. | |
| 5,819,619 A | 10/1998 | Miller et al. | |
| 5,829,483 A * | 11/1998 | Tukahara | F16L 9/18 138/121 |
| 5,915,736 A * | 6/1999 | Marik | H02G 11/00 285/139.2 |
| 5,931,072 A | 8/1999 | Shibata | |
| 5,983,950 A * | 11/1999 | Aoki | F16L 25/0036 138/121 |
| 6,013,079 A | 1/2000 | Salam | |
| 6,183,527 B1 | 2/2001 | O'Banion et al. | |
| 6,427,570 B1 | 8/2002 | Miller et al. | |
| 6,431,040 B1 | 8/2002 | Miller et al. | |
| 6,470,778 B1 | 10/2002 | Kaye, Jr. et al. | |
| 6,510,772 B2 | 1/2003 | Brickner, Jr. et al. | |
| 6,742,425 B2 | 6/2004 | Oktavec et al. | |
| 6,769,452 B2 * | 8/2004 | Qutub | F16L 11/125 138/139 |
| 6,783,563 B1 | 8/2004 | Eckhoff et al. | |
| 6,796,208 B1 * | 9/2004 | Jorgensen | B23Q 11/0046 83/100 |
| 6,827,640 B2 | 12/2004 | Bures et al. | |
| 6,935,939 B1 | 8/2005 | Buser et al. | |
| 6,960,124 B2 | 11/2005 | Lee | |
| 6,988,435 B2 | 1/2006 | Kao | |
| 7,013,884 B2 | 3/2006 | Guth | |
| 7,040,239 B2 | 5/2006 | Shelton et al. | |
| 7,204,178 B2 | 4/2007 | Bergmann | |
| 7,216,572 B2 | 5/2007 | Keenan | |
| 7,222,560 B2 | 5/2007 | Parks et al. | |
| 7,559,268 B2 | 7/2009 | Sasaki et al. | |
| 7,654,181 B2 | 2/2010 | Quinlan | |
| 7,763,091 B1 | 7/2010 | Nunke | |
| 7,775,143 B2 * | 8/2010 | Yu | B23D 59/006 83/100 |
| 7,789,003 B2 | 9/2010 | Chen | |
| 7,802,505 B2 | 9/2010 | Hetcher et al. | |
| 7,882,771 B2 | 2/2011 | Sasaki et al. | |
| 7,905,260 B2 | 3/2011 | Keenan | |
| 7,980,163 B2 | 7/2011 | Meredith et al. | |
| 8,061,044 B2 * | 11/2011 | Saitoh | B24B 55/102 30/124 |
| 8,061,250 B2 | 11/2011 | Ushiwata et al. | |
| 8,069,761 B2 | 12/2011 | Brunson et al. | |
| 8,161,858 B2 | 4/2012 | Aoyama | |
| 8,272,303 B2 | 9/2012 | Pierga et al. | |
| 8,272,304 B2 | 9/2012 | Lawlor et al. | |
| 8,459,158 B2 | 6/2013 | Pierga et al. | |
| 8,522,656 B2 | 9/2013 | Kani et al. | |
| 8,726,773 B2 | 5/2014 | Koegel et al. | |
| 8,726,774 B1 | 5/2014 | Kellum | |
| 8,776,836 B2 * | 7/2014 | Ragner | F16L 11/118 138/119 |
| 8,869,786 B2 * | 10/2014 | Faiweather | B23D 47/025 83/477.1 |
| 8,919,173 B2 * | 12/2014 | Hibino | F16L 11/112 72/370.19 |
| 9,149,951 B2 | 10/2015 | Keenan | |
| 9,221,110 B2 | 12/2015 | Guth | |
| 9,512,772 B2 | 12/2016 | Lucky et al. | |
| 10,428,978 B2 * | 10/2019 | Douglass, III | B29C 48/303 |
| 2005/0262978 A1 | 12/2005 | Hetcher et al. | |
| 2006/0185484 A1 * | 8/2006 | Sasaki | B23Q 11/0071 83/486.1 |
| 2006/0230898 A1 * | 10/2006 | Brunson | B23D 45/048 83/100 |
| 2011/0179923 A1 | 7/2011 | Tsuda et al. | |
| 2012/0073077 A1 * | 3/2012 | Ishikawa | A47L 9/2842 15/347 |
| 2012/0090439 A1 * | 4/2012 | Butler | F16P 3/147 83/100 |
| 2012/0285308 A1 | 11/2012 | Koegel | |
| 2013/0081280 A1 * | 4/2013 | Moreno | B23D 59/006 30/124 |
| 2016/0031054 A1 * | 2/2016 | Chang | B23Q 11/0046 144/252.1 |
| 2016/0318109 A1 * | 11/2016 | Koegel | B23D 45/06 |
| 2017/0056988 A1 | 3/2017 | Guth | |

* cited by examiner

COLLECTING SAWDUST AND OTHER DEBRIS FROM POWER SAWS

CROSS-REFERENCE TO RELATED APPLICATIONS

The present application is a continuation of U.S. patent application Ser. No. 15/336,422, filed Oct. 27, 2016, and which claims the benefit of U.S. Provisional patent Application No. 62/211,096, filed Aug. 28, 2015, both of which are hereby incorporated by reference herein in their entirety.

FIELD

The present disclosure relates to accessories for powers saws, more particularly, accessories for collecting sawdust and other debris from power saws.

BACKGROUND OF THE DISCLOSURE

The most common used power saws in the construction industry and home shops are chop saws, compound miter saws, and sliding compound miter saws. These saws are typically mounted on stands and may create a large amount of sawdust that is often ejected openly in the room where it is used. The dust collection systems readily available on the market today are large stands with a wraparound shield system attached. These discharge systems are expensive and difficult to set up and move on a daily basis. Large complete table top level stands that incorporate dust collection are expensive and time consuming to set up. They also take up a lot of room in the work trucks for storage.

SUMMARY

An apparatus in accordance with the present detailed description comprises a duct and a skirt. The apparatus may be attached between a five gallon bucket and a power saw so that debris generated by the power saw is collected in the five gallon bucket. The power saw may be one of a plurality of compatible power saws. The duct has an upstream edge, a downstream edge and a duct wall extending between the upstream edge and the downstream edge. The duct wall having an inner surface defining a tube lumen. In one or more embodiments, the duct has a collapsed shape and an extended shape. In one or more embodiments, the duct is repeatedly extendable from the collapsed shape to the extended shape for use with the power saw. The one or more embodiments, the duct is also repeatedly collapsible from the extended shape to the collapsed shape for transportation or storage. The duct has a first length while assuming the collapsed shape and a second length while assuming the extended shape. In one or more embodiments, the second length being greater than the first length. The duct wall comprises an inner sleeve, a support wire disposed along a path about the inner sleeve, and an outer sleeve disposed about both the support wire and the inner sleeve so that the support wire is disposed between the inner sleeve and the outer sleeve. The support wire forms a plurality of turns with each turn encircling the inner sleeve. The duct is self-supporting in maintaining its circular shape and when the upstream edge is attached to the saw with the duct extending initially horizontally, the duct makes a self-supporting 90 degree turn to extend downward by gravity toward the bucket or other receptacle without a reduction in cross sectional interior area.

The downstream edge of the duct wall defines a downstream opening fluidly communicating with the duct lumen. The downstream opening and the duct lumen is adapted and dimensioned to receive an upper portion of a five gallon bucket. In one or more embodiments, the inner surface of the duct wall forms a friction fit with the upper portion of the five gallon bucket when upper portion of the bucket is advanced through the downstream opening. The skirt extends in the upstream direction beyond the upstream edge of the duct wall. The skirt comprises a sheet material extending between a forward edge and a rearward edge. The forward edge of the sheet material undulates between a plurality of peaks and valleys so that the sheet material forms a plurality of flaps. Each flap is disposed between a pair of valleys. Each flap having a base portion and a tip portion. Each flap has a width that becomes smaller as the flap extends in an upstream direction from the base portion to the tip portion. Each flap defining a plurality of holes. In one or more embodiments, the skirt is disposed about the upstream edge of the duct wall. In one or more embodiments, the skirt is positioned so that a plane defined by the upstream edge of the duct extends through the sheet material between the forward edge of the skirt and the roots of the peaks so that a margin of unrestricted sheet material extends in the upstream direction beyond the upstream edge of the duct.

In one or more embodiments, the apparatus or kit includes a debris conduit having an upstream end and a downstream end. The debris conduit comprises a conduit wall extending between the upstream end and the downstream end. The conduit wall defines a debris channel. In one or more embodiments, the apparatus or kit includes retaining element for detachably attaching the upstream end of the debris conduit to the discharge port of the power saw. The retaining element comprises a sheath. The sheath comprises a sheath wall having a first edge and a second edge. The sheath wall extends between the first edge and the second edge. The sheath wall comprises an everted portion, a non-everted portion and a fold disposed between the everted portion and the non-everted portion. The sheath wall is folded back upon itself at the fold. In operation, when the skirt is attached to the power saw and the upstream end of the debris conduit is connected to the discharge port of the power saw, debris thrown by the rotating sawblade passes through the debris channel defined by the conduit wall and falls into the five gallon bucket.

A feature and advantage of embodiments is a debris collection apparatus for a saw mounted on a stand, the stand elevating the saw above floor level 2 to 4 feet. The saw having a saw head that is pivotal upwardly and downward manually about a horizontal axis for sawing boards. Such saws include miter saws and chop saws and have a rearward debris discharge port. The debris collection apparatus collapsible main duct with a diameter of 8 inches to 20 inches that is attachable to the saw to encompass the rearward debris discharge port. The outlet of the discharge port oriented to extend axially within the main duct. The forward or upstream end of the main duct attachable to the saw by way of at least one elastic member. In embodiments, the elastic member may be a skirt of elastic sheet material circumferentially attached to the duct and extending forward with a plurality of projections to facilitate attachment to the saw. A second smaller duct having a diameter of from 1½ inches to 3 inches is attachable to a discharge outlet of the saw and extends downward substantially axially within the duct a distance greater than 4 inches from the discharge outlet. In embodiments, a distance of from 4 to 12 inches. In embodiments, a distance of from 6 to 20 inches. In embodiments the second smaller duct is substantially contained within the interior of the first duct. In embodiments the second duct is 100% contained within the interior of the first duct. In embodiments the duct is collapsible axially and resists collapsing radially. In embodiment the duct is configured as a collapsible bellows.

In embodiments, a primary duct encompasses a discharge conduit that is connected to the discharge outlet of a miter or chop saw, the axis of the duct at that point is horizontal. The primary duct then bends downward with a substantially 90 degree bend and then has a substantial vertical axis. In embodiments most of the length of the main duct extends downwardly within 15 degrees of vertical. In embodiments, the main duct is sized to a 5 gallon bucket or other receptacle and whereby most of the length of the duct is positioned over the 5 gallon bucket or other receptacle. A feature and advantage of embodiments is that the apparatus effectively collects saw debris while minimizing airborne dust and does not utilize blowers or vacuum systems, the apparatus is essentially passive. In embodiments, a relatively smaller debris duct is contained within a larger main duct, as the debris is discharged in a downstream direction to a bucket which may be sealingly engaged with the main duct, the expanded area of the main duct allows the saw dust and debris to substantially fall downward while the discharge air from the saw discharge slowly rises and exits through the front end of the duct attached to the saw. Such exiting is substantially debris free.

A feature and advantage of one or more embodiments includes providing a universal system that allows a standard five gallon bucket to collect debris from various makes and models of power saw.

A feature and advantage of one or more embodiments is a system that can be easily removed from a worksite at the end of the day to prevent theft of the power saw and/or power saw dust collection system in contrast to a system that is too difficult and time consuming to set up on a daily basis.

A feature and advantage of embodiments is a packaged kit with an axially collapsed duct that can have one end attached to a miter or chop saw with the duct radially spaced from and surrounding a debris discharge of the saw, and then allowing the expanded lengthwise duct to gradually turn down toward the floor to a receptacle. In embodiments, the width of the duct remains substantially (within 10%) the same between the collapsed and expanded modes.

A feature and advantage of embodiments is a duct that opens and turns without sharp corners and maintaining the circular interior wall.

A feature and advantage of a system for transferring saw debris includes a collapsible duct with a circular periphery of at least 8 inches that collapses axially and that is sized for a receptacle with a like sized mouth. The duct connecting to the receptacle mouth to minimize debris escaping from the duct and/or receptacle. In embodiments, the receptacle is a bucket with a mouth that is a continuation of the receptacle wall that extends to a bucket bottom wall.

The apparatus disclosed herein provides a very simple, inexpensive solution to various dust collection problems. The collapsible plastic duct attaches onto the back of the saw using adjustable elastic clamps and is expanded to slip directly over a standard 5 gallon pail. A small exhaust fan may also be attached to the 5 gallon pail to assist in pulling in the dusty air created by the saw.

This system will adapt to most any chop style saw and will work with most any standard five gallon bucket on the market. The system will significantly reduce the amount of dust and debris that is created at the job site, making clean up faster and easier. The bulk of the sawdust and debris is captured in the attached bucket. The product takes up very little storage space. Set up and break down is fast and easy. Accordingly, a feature and advantage of one or more embodiments is a system that is very compact, quick to set up and very inexpensive as compared to existing dust collection systems on the market.

This system is a low cost, almost disposable system. Contractors and home owners can use the system anywhere they are working and significantly reduce clean up at the end of the job.

The above summary is not intended to describe each illustrated embodiment or every implementation of the present disclosure.

BRIEF DESCRIPTION OF THE FIGURES

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
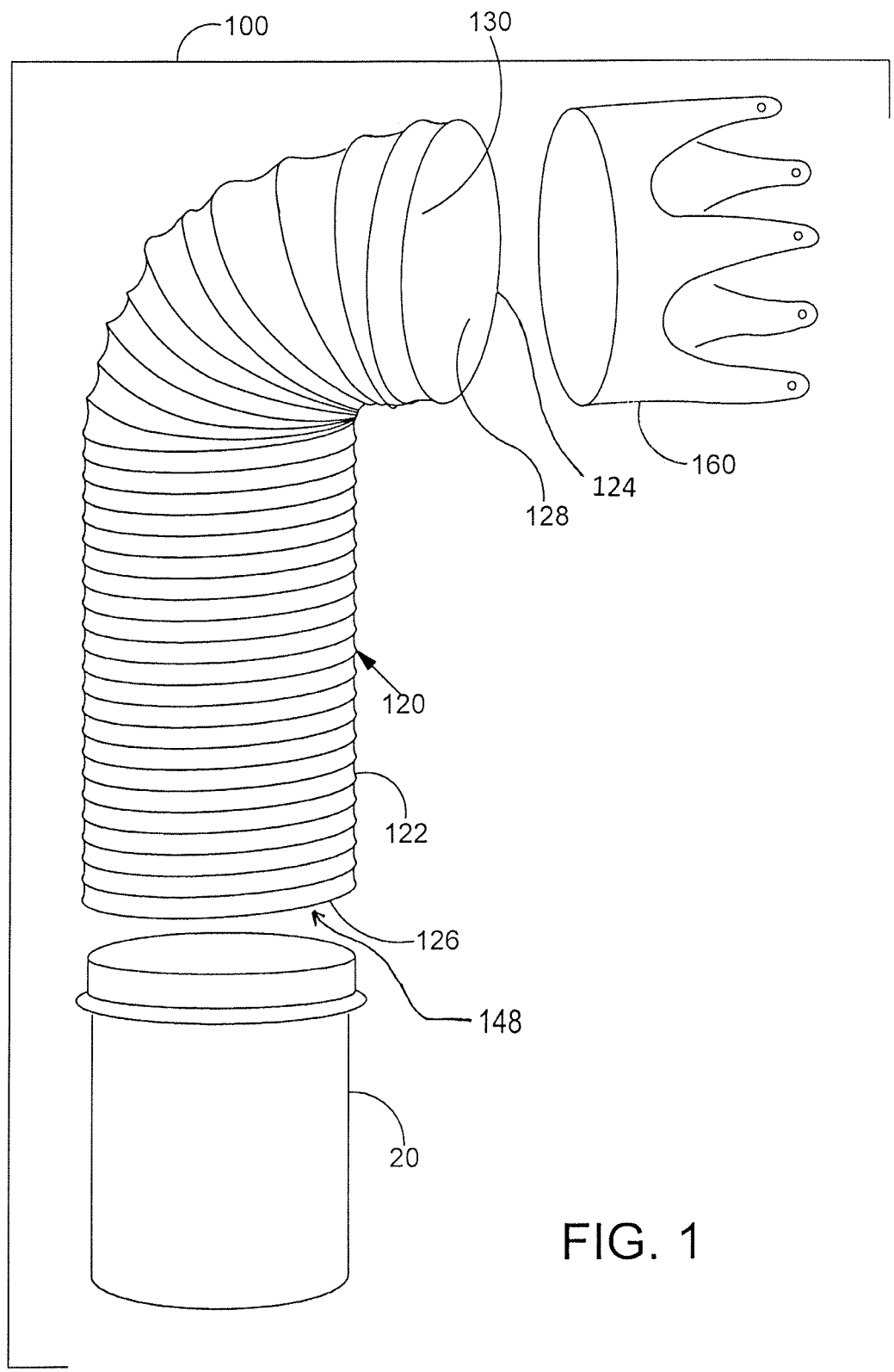
FIG. 1 is an exploded view showing a system for collecting sawdust and other debris from a power saw.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 2:
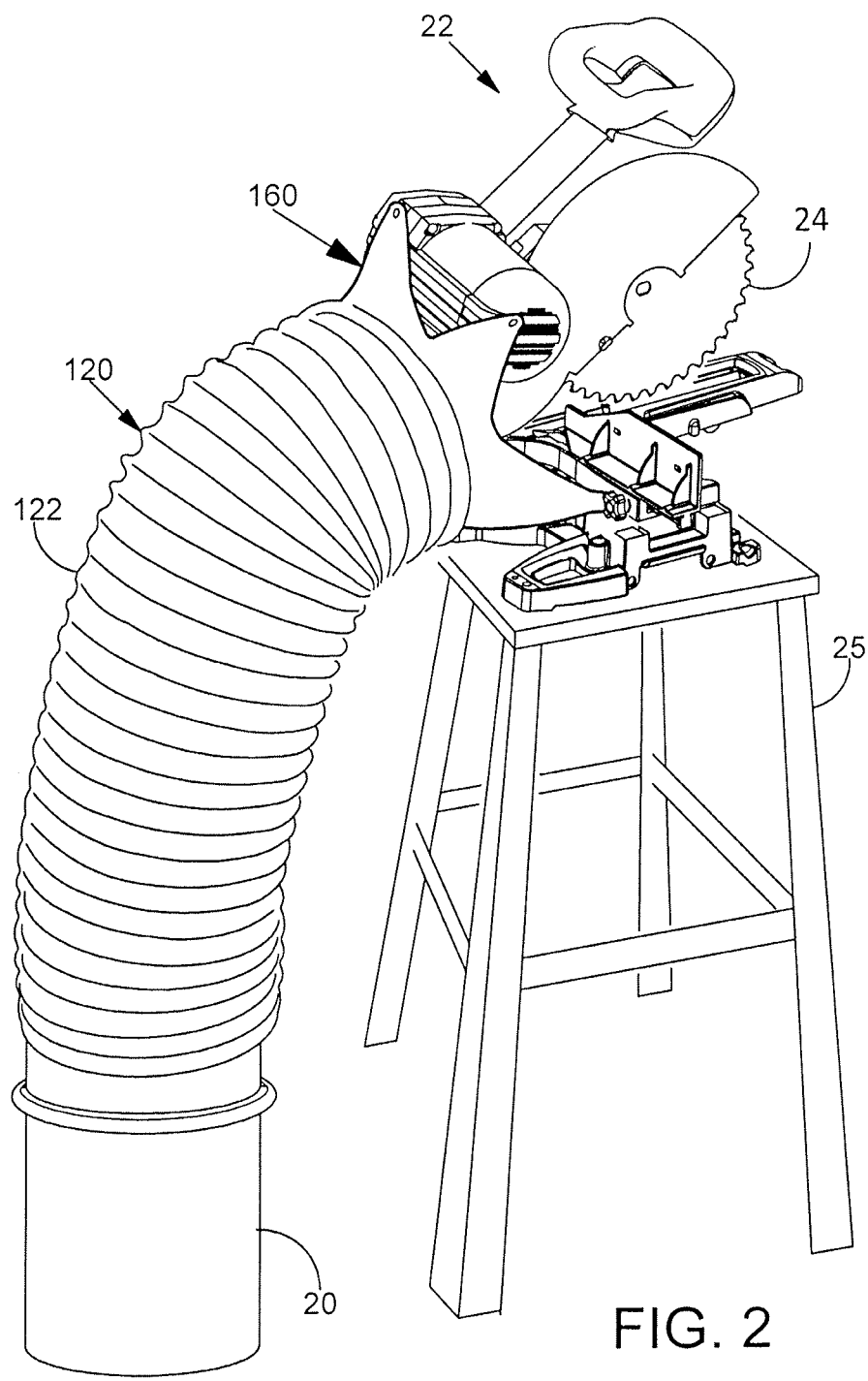
FIG. 2 is a perspective view showing a power saw and a system for collecting sawdust and other debris from the power saw, the system including a duct and a skirt.
Figure 3:
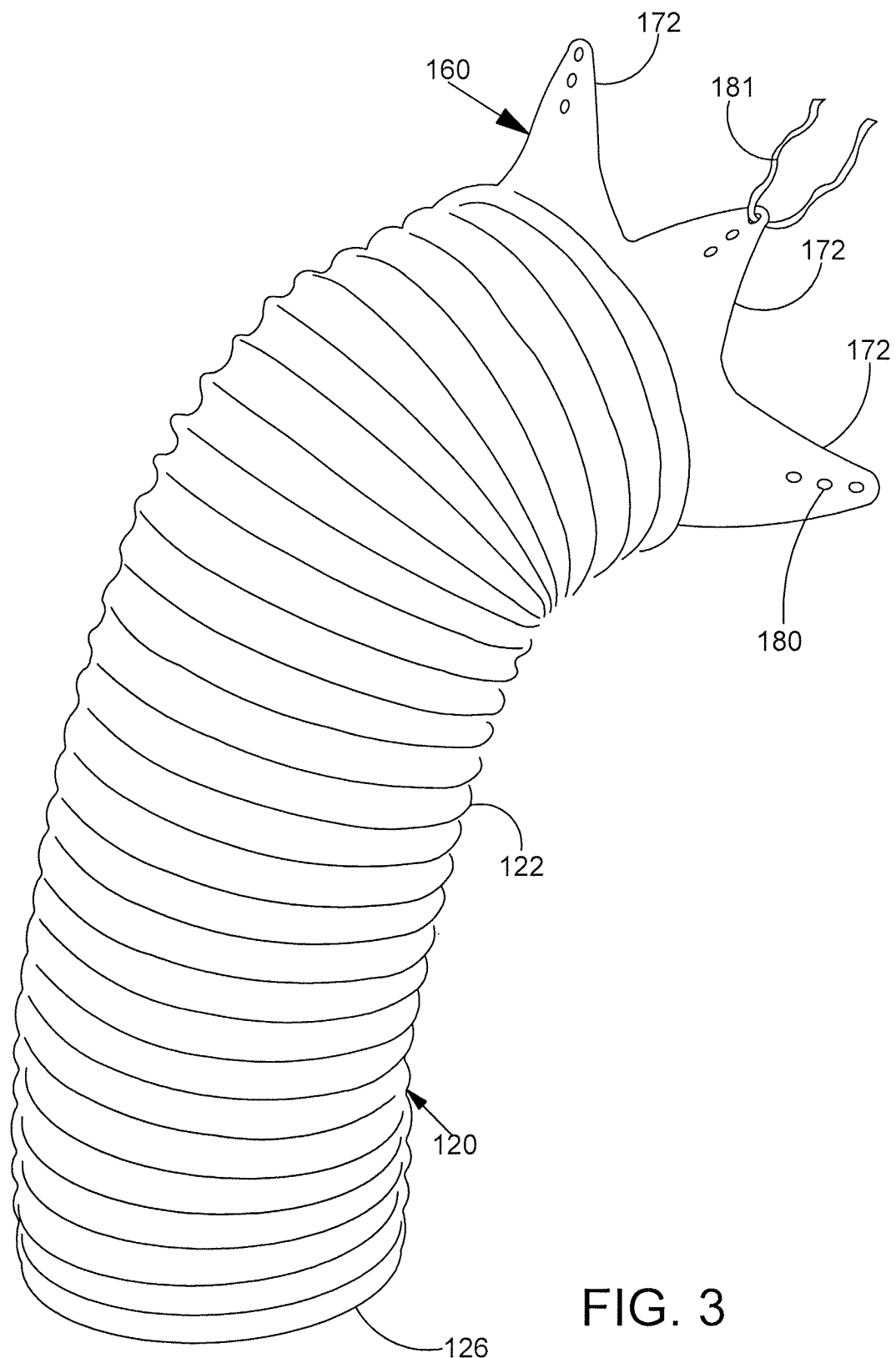
FIG. 3 is an enlarged a perspective view showing the duct and the skirt shown in FIG. 2.
Figure 13:
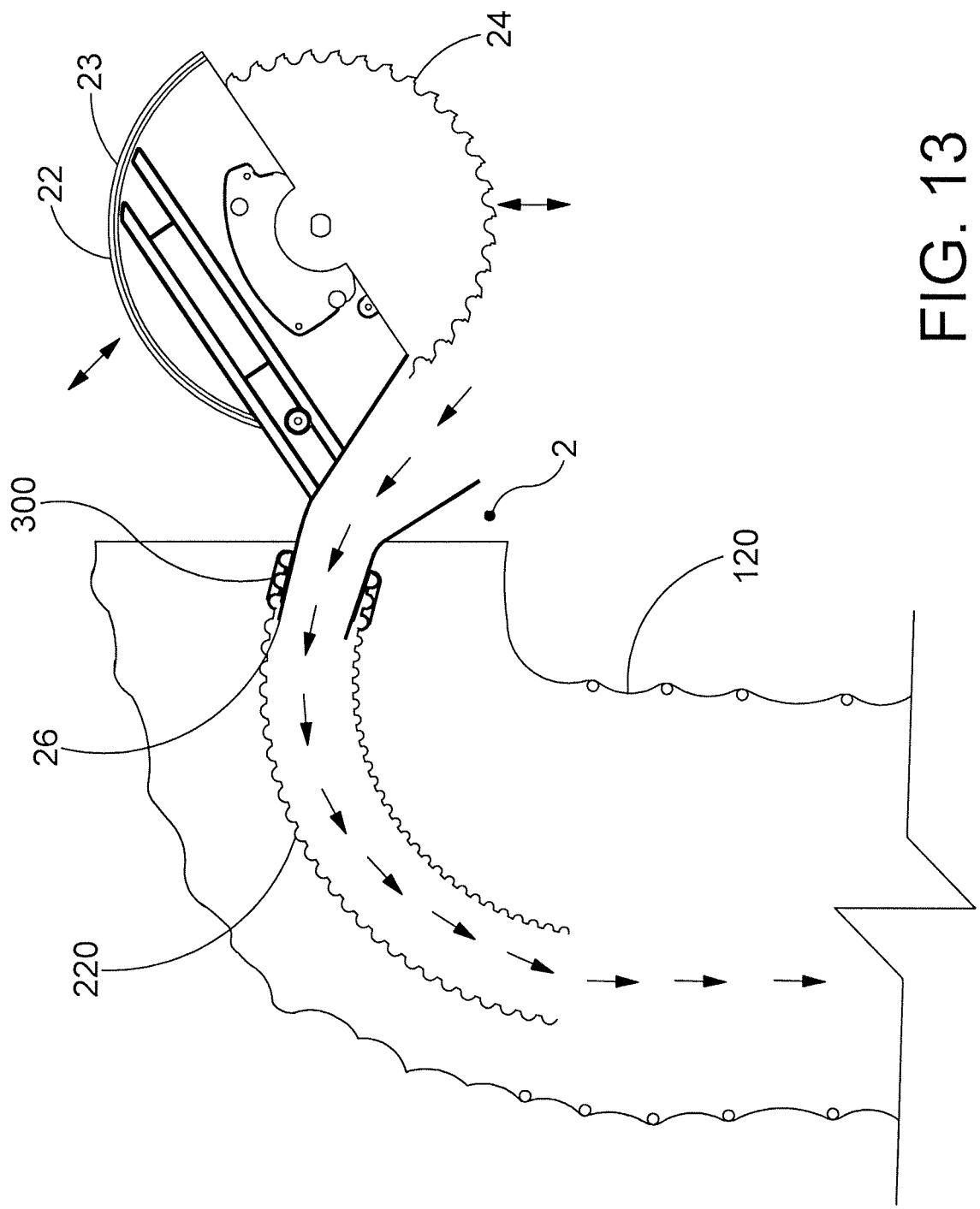
FIG. 13 is a stylized cross-sectional view showing a power saw, a debris conduit and a duct.

Referring to FIG. 1 through FIG. 13, an apparatus in accordance with the present detailed description comprises a duct 120 and a skirt 160. In FIG. 1, the apparatus 100 is shown attached between a five gallon bucket 20 and a power saw 22 so that debris generated by the power saw 22 is collected in the five gallon bucket 20. The power saw 22 maybe a miter saw or a chop saw or one of a plurality of other compatible power saws. As shown in FIGS. 2 and 13, the power saw 22 includes a saw head 23 with a rotating sawblade 24 and an cutting debris discharge port 26 positioned proximate the rotating sawblade 24. The saw head is manually pivotable about a horizontal axis 2 to move the saw blade upwardly and downwardly for cutting boards. Such saws are typically mounted on stands 25.

Figures 4A, 4B:
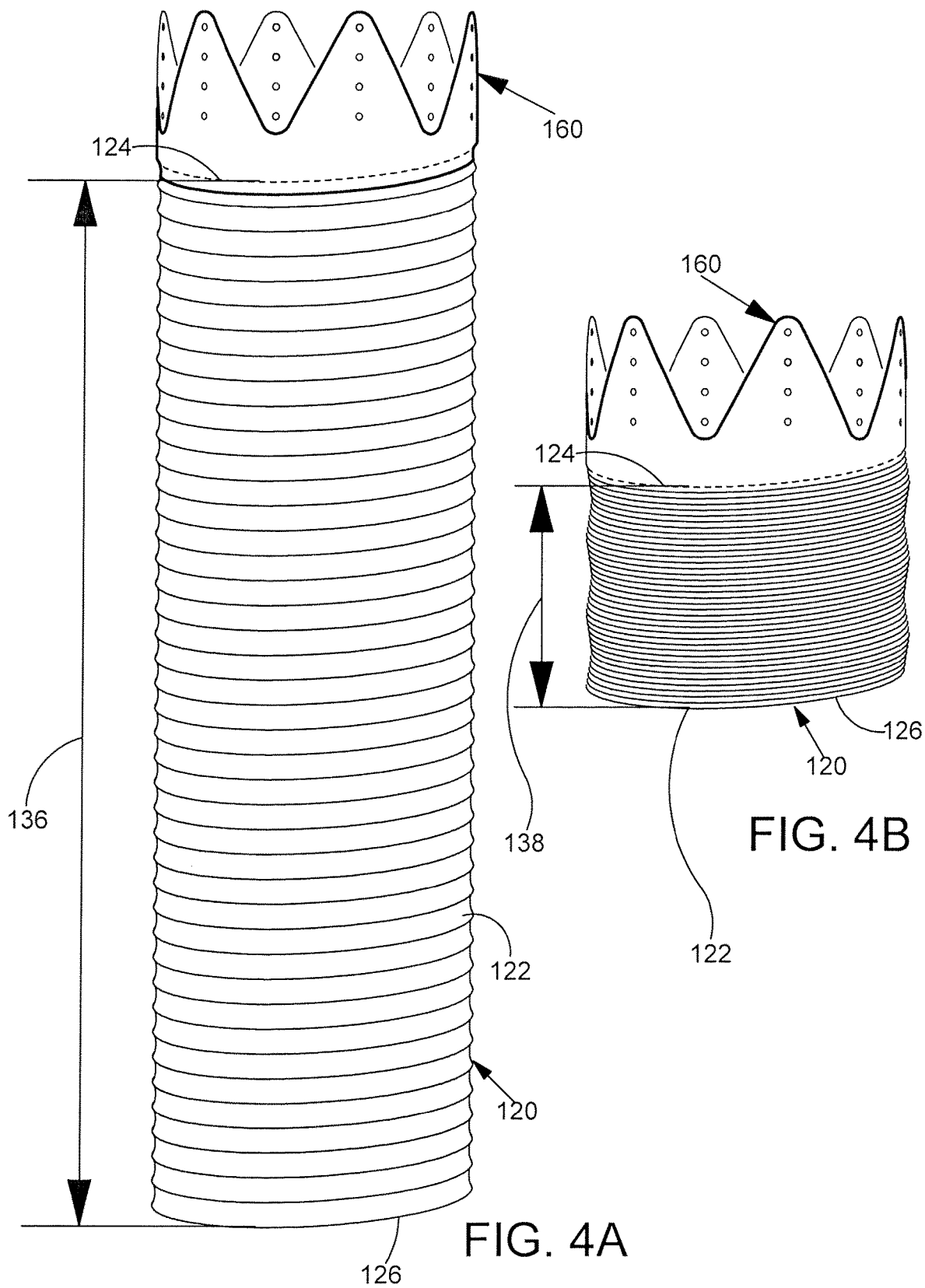
FIG. 4A is a side view showing a duct assuming an expanded shape, the duct having an expanded length while the duct is assuming the expanded shape.
FIG. 4B is a side view showing a duct assuming an collapsed shape, the duct having an collapsed length while the duct is assuming the collapsed shape.
Figure 5:
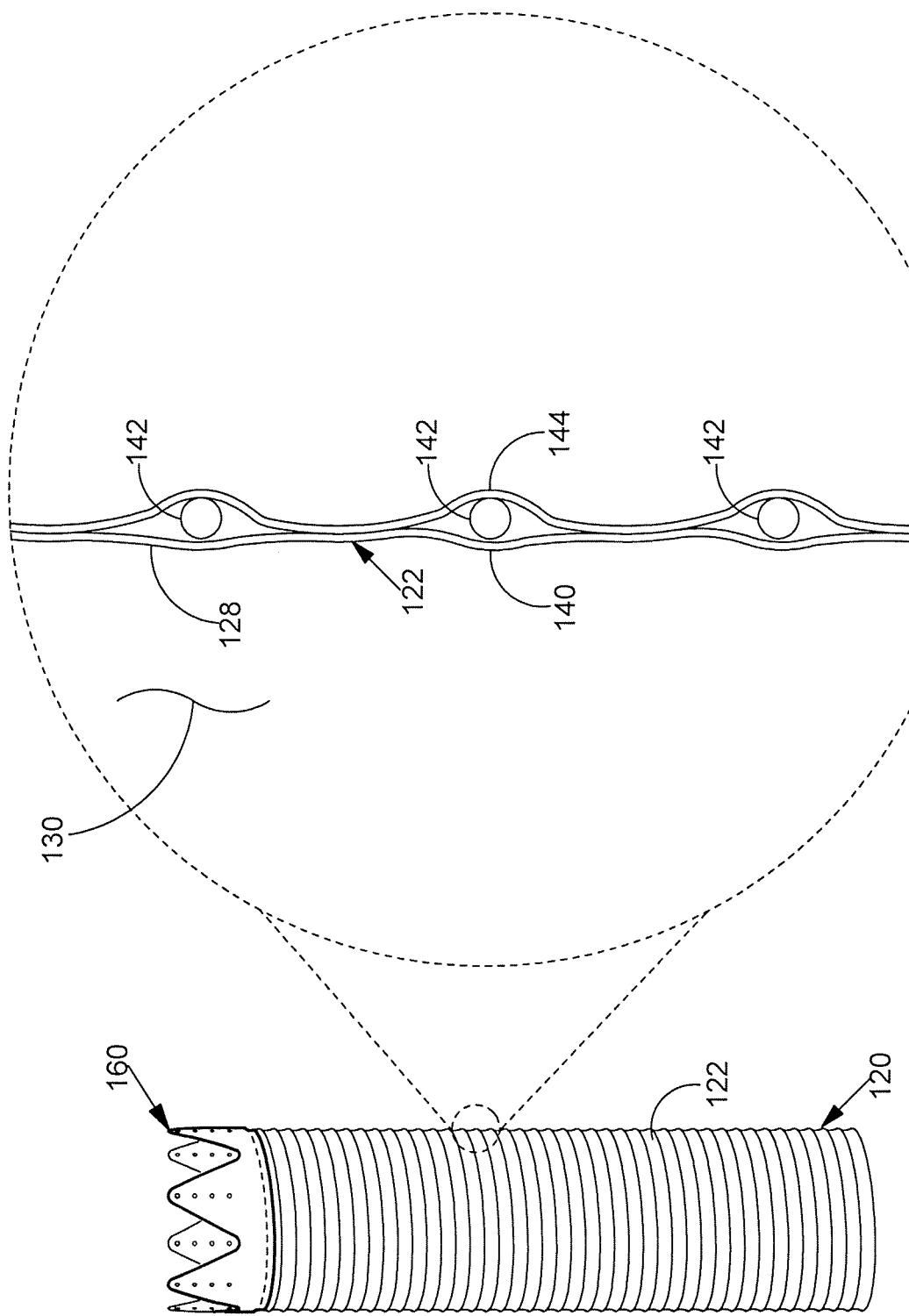
FIG. 5 includes a side view showing a duct and an enlarged cross-sectional view further illustrating a portion of the duct.
Figure 6B:
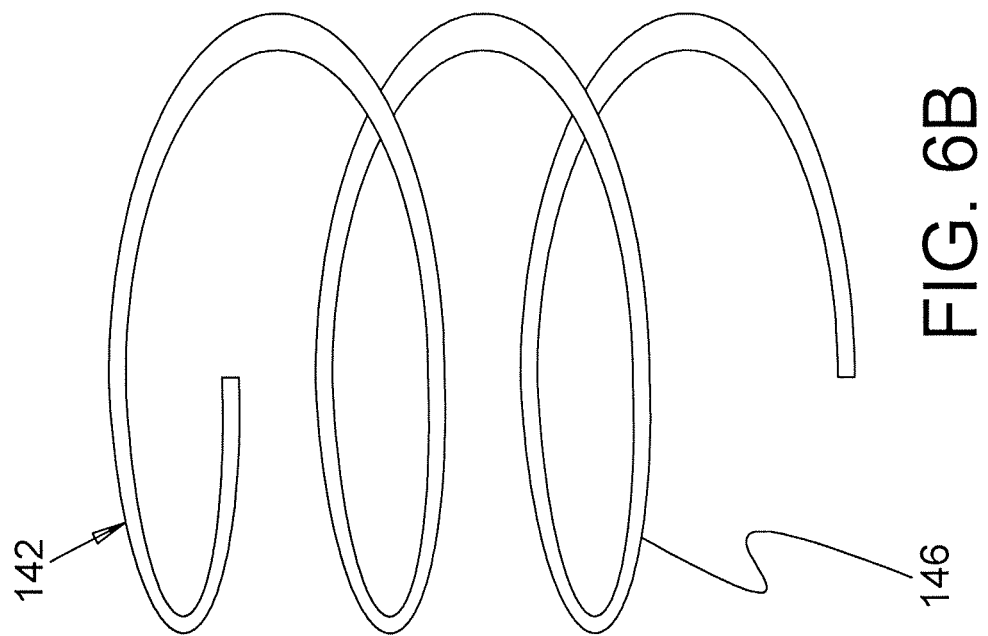
FIG. 6B is a perspective view showing an illustrative portion of support wire in accordance with the detailed description.
Figure 6A:
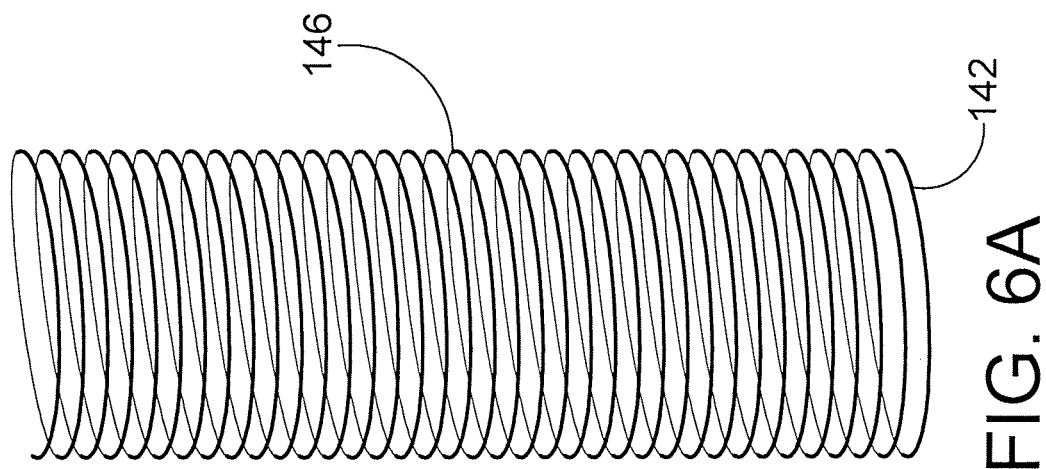
FIG. 6A is a perspective view illustrating a support wire.
Figure 14:
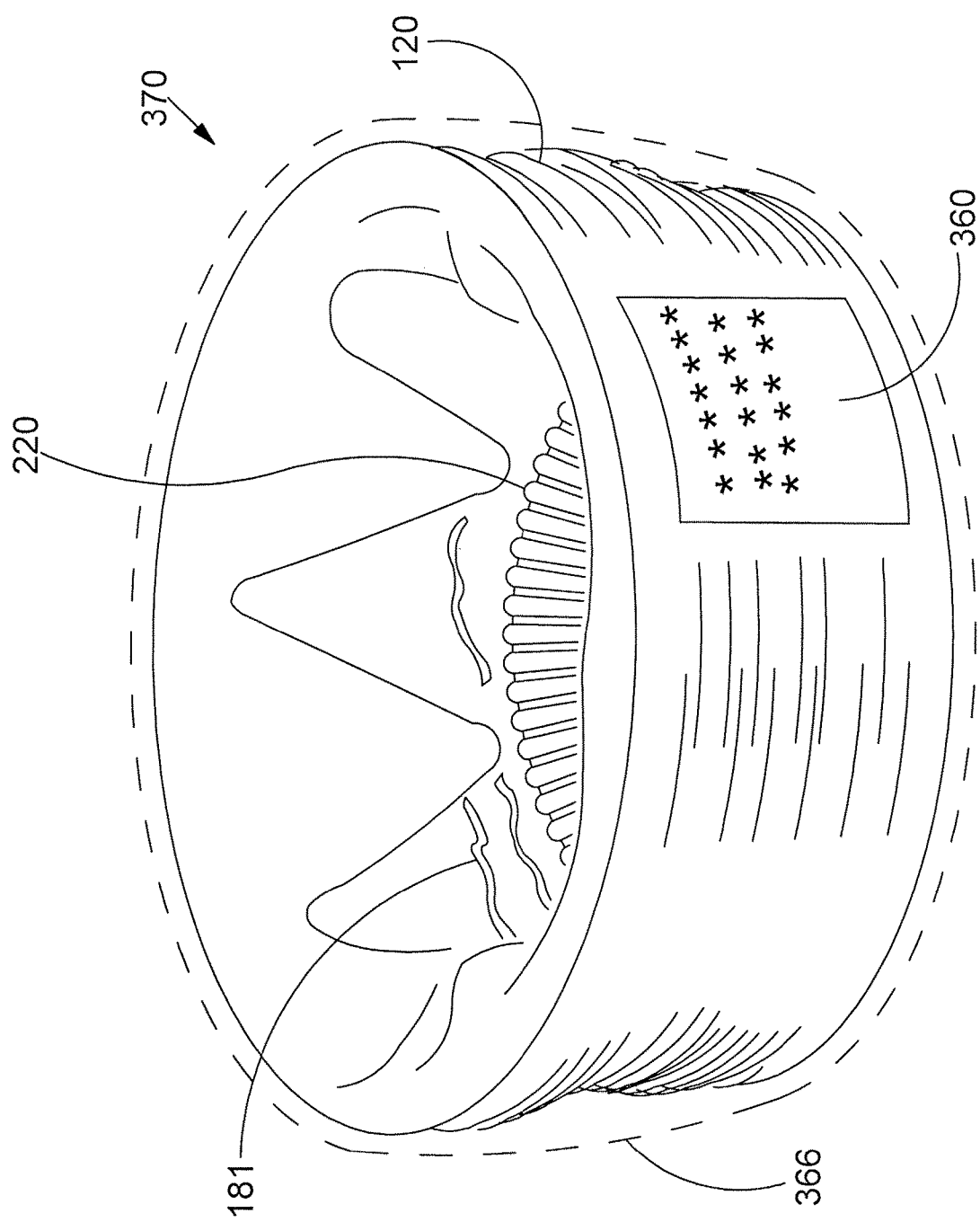
FIG. 14 is a perspective view of a packaged kit in accord with embodiments.

Referring to FIG. 1 through FIG. 14, the duct 120 has an upstream edge 124, a downstream edge 126 and a duct wall 122 extending between the upstream edge 124 and the downstream edge 126. The duct wall 122 having an inner surface 128 defining a tube lumen 130. In one or more embodiments, the duct 120 has a collapsed shape as shown in FIGS. 4B and 14, and an extended shape with a length 136 as shown in FIG. 4A. In one or more embodiments, the duct 120 is repeatedly extendable from the collapsed shape to the extended shape for use with the power saw 22. In embodiments, the collapsed length can be less than three inches and the extended length greater than three feet while the width, that is the diameter does not appreciably change, that is the diameter does not vary more that 10% between the extended and collapsed lengths. In embodiments the diameter does not vary more that 20% between the extended and collapsed lengths. In embodiments, the collapsed length can be less than four inches and the extended length greater than four feet. In embodiments, the extended length can be 10 times the collapsed length. In embodiments, the extended length can be 15 times the collapsed length. In one or more embodiments, the duct 120 is also repeatedly collapsible from the extended shape 134 to the collapsed shape 132 for transportation or storage while maintaining its circular tubular shape. The duct 120 has a first length 136 while assuming the collapsed shape 132 and a second length 138 while assuming the extended shape 134. In one or more embodiments, the second length 138 being greater than the first length 136. The duct wall 122 comprises an inner sleeve 140, a support wire 142 disposed along a path about the inner sleeve 140, and an outer sleeve 144 disposed about both the support wire 142 and the inner sleeve 140 so that the support wire 142 is disposed between the inner sleeve 140 and the outer sleeve 144. The support wire 142 forms a plurality of turns 146 with each turn 146 encircling the inner sleeve 140.

The downstream edge 126 of the duct wall 122 defines a downstream opening 148 fluidly communicating with the duct lumen 130. The downstream opening 148 and the duct lumen 130 is adapted and dimensioned to receive an upper portion of a five gallon bucket 20. In one or more embodiments, the inner surface 128 of the duct wall 122 forms a friction fit with the upper portion of the five gallon bucket 20 when upper portion of the bucket 20 is advanced through the downstream opening 148. The skirt 160 extends in the upstream direction beyond the upstream edge 124 of the duct wall 122. The skirt 160 comprises a sheet material 162 extending between a forward edge 164 and a rearward edge 166. The forward edge 164 of the sheet material 162 undulates between a plurality of peaks 168 and valleys 170 so that the sheet material 162 forms a plurality of flaps 172. Each flap 172 is disposed between a pair of valleys 170. Each flap 172 having a base portion 174 and a tip portion 176. Each flap 172 has a width 178 that becomes smaller as the flap 172 extends in an upstream direction from the base portion 174 to the tip portion 176. Each flap 172 defining a plurality of holes 180. In one or more embodiments, the skirt 160 is disposed about the upstream edge 124 of the duct wall. In one or more embodiments, the skirt 160 is positioned so that a plane defined by the upstream edge 124 of the duct 120 extends through the sheet material between the forward edge of the skirt and the roots of the peaks so that a margin of unrestricted sheet material 158 extends in the upstream direction beyond the upstream edge 124 of the duct.

The holes in each flap may be used to attach the duct to the saw, for example, by removing a threaded fastener on the saw, inserting the threaded fastener through one of the holes in the flap, and replacing the threaded fastener. Alternatively, the holes can receive S-shaped hooks or mini elastic bungee cords with the opposite ends of the hooks or bungee cords attached to appropriate places on the saw. Suitably, strips 181 of elastic material, which may be the same material as the skirt material, may be included in the kit for use in attaching the skirt to the saw. This is particularly suitable for horizontally sliding saw heads of certain miter saws. The strips may be threaded through holes in the flaps and attached to suitable locations on the saw. The strips may be configured as loops, for example, rubber bands, or strips with two ends and with a plurality of holes.

In one or more embodiments, the apparatus or kit includes a debris conduit 220 having an upstream end 224 and a downstream end 226. The debris conduit 220 comprises a conduit wall 222 extending between the upstream end 224 and the downstream end 226. The conduit wall 222 defines a debris channel 230. In one or more embodiments, the apparatus or kit includes retaining element 300 for detachably attaching the upstream end 224 of the debris conduit 220 to the discharge port 26 of the power saw 22. The retaining element 300 comprises a sheath 320. The sheath 320 comprises a sheath wall 322 having a first edge 324 and a second edge 326. The sheath wall 322 extends between the first edge 324 and the second edge 326. The sheath wall 322 comprises an everted portion 328, a non-everted portion 330, and a fold 332 disposed between the everted portion 328 and a non-everted portion 330. The sheath wall 322 is folded back upon itself at the fold 332. In operation, when the skirt 160 is attached to the power saw 22 and the upstream end 224 of the debris conduit 220 is connected to the discharge port 26 of the power saw 22, debris thrown by the rotating sawblade 24 passes through the debris channel 230 defined by the conduit wall 222 and falls into the five gallon bucket 20.

Figure 7:
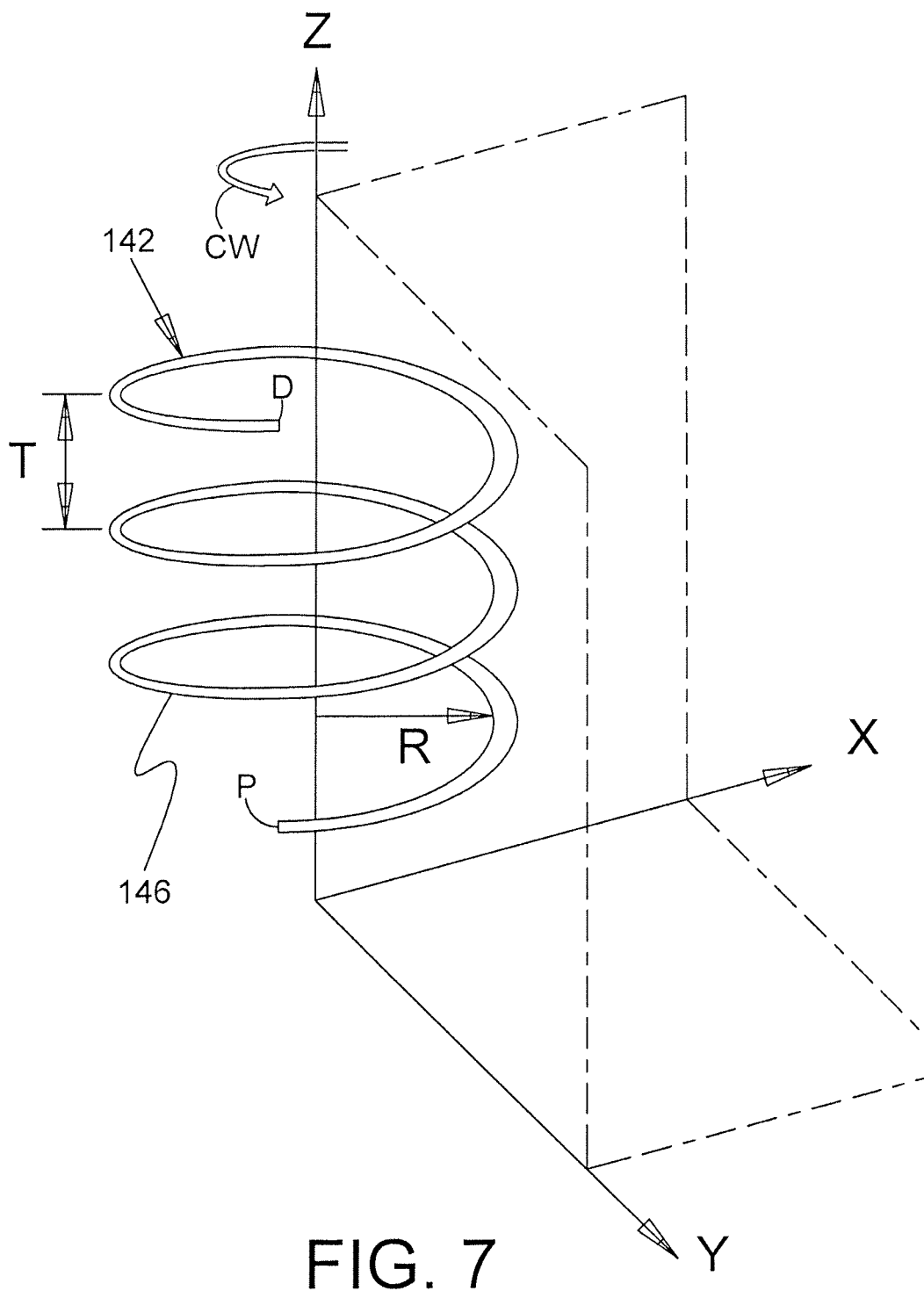
FIG. 7 is an additional perspective view further explaining the illustrative portion of support wire shown in FIG. 6B.
Figure 8:
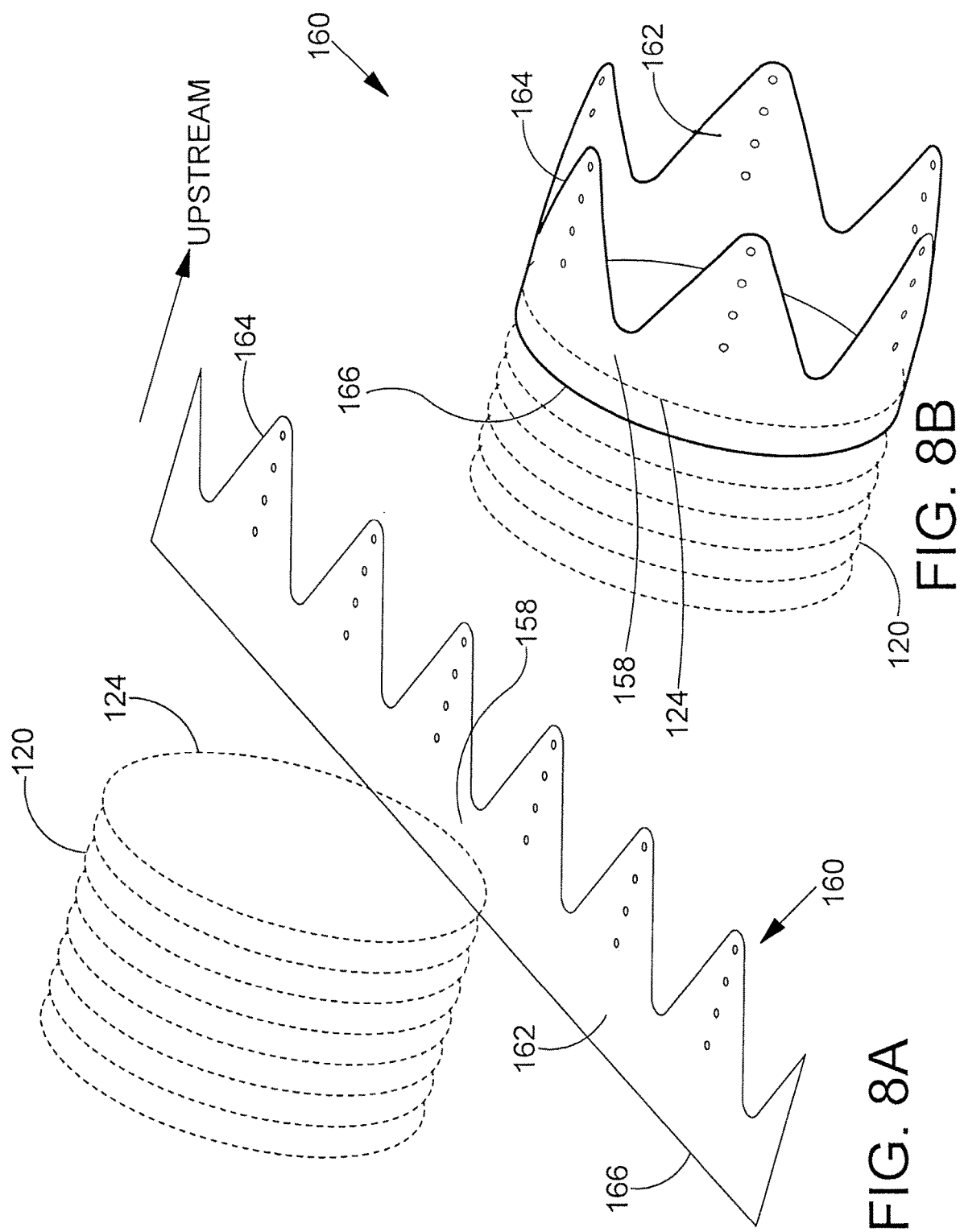
FIG. 8A is a perspective view of an assembly including a skirt disposed about an upstream edge of and a duct.
FIG. 8B is an exploded perspective view of the assembly shown in FIG. 8A.
Figure 9:
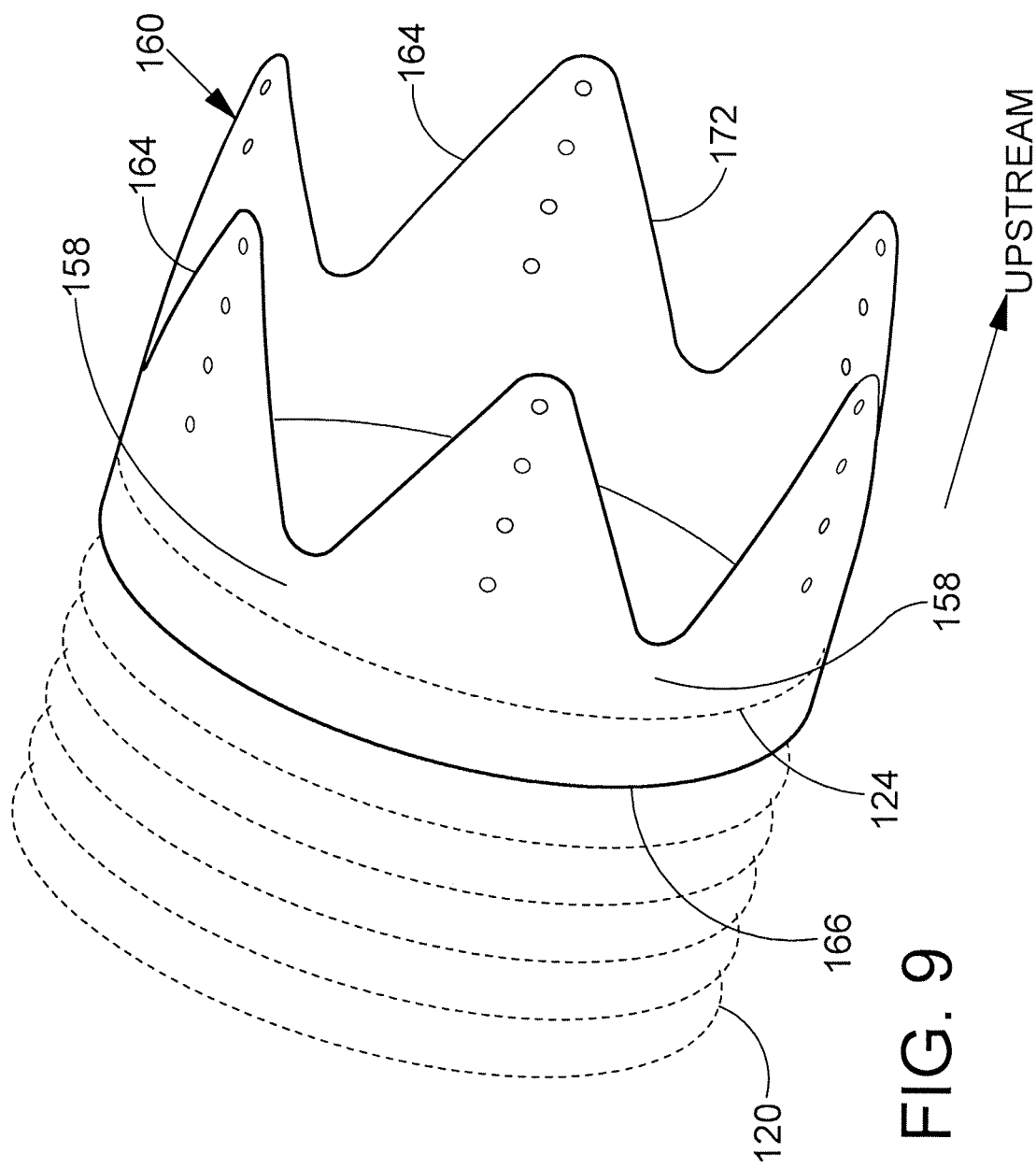
FIG. 9 is an enlarged perspective view of the assembly shown in FIG. 8A.
Figure 10:
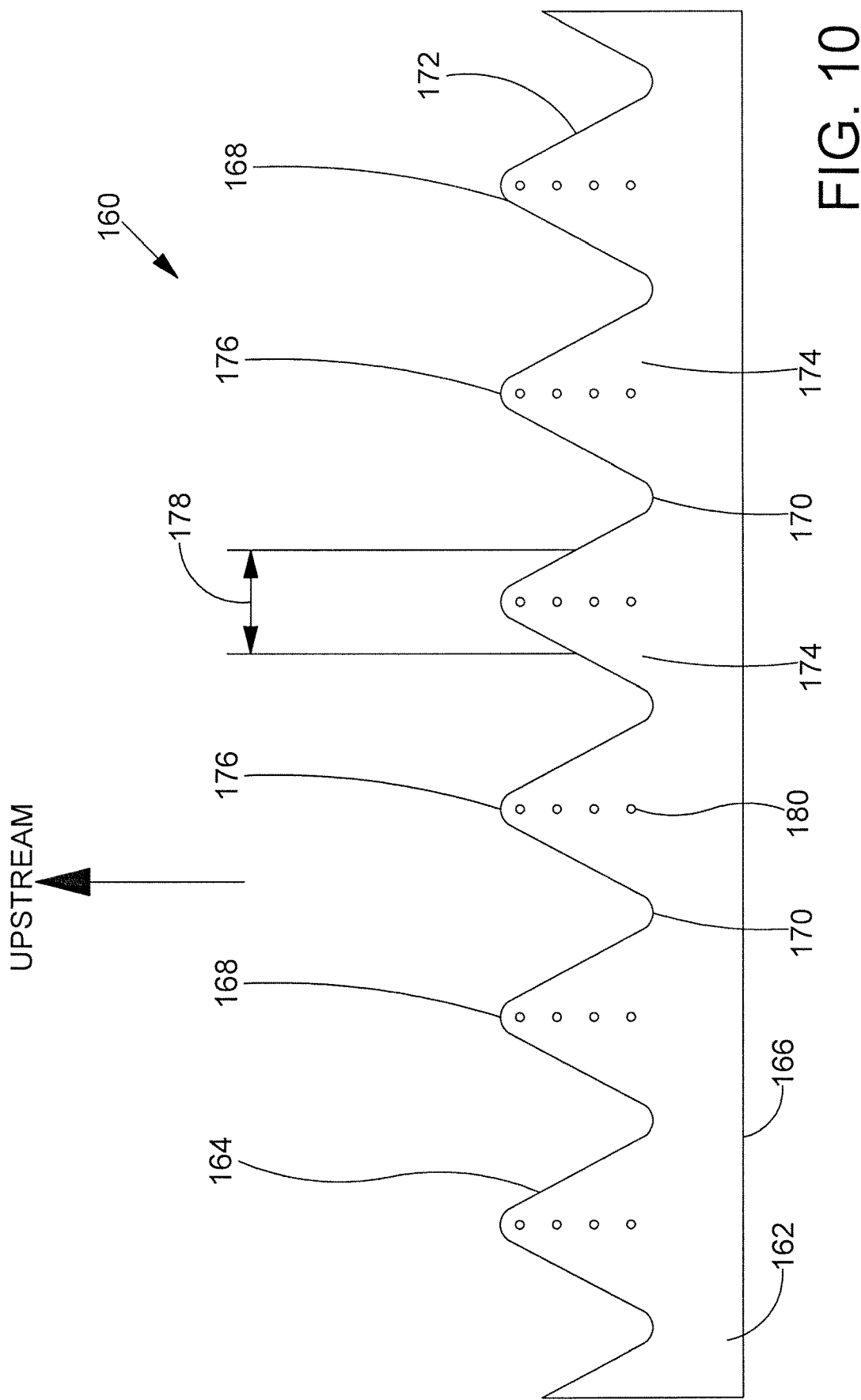
FIG. 10 is a plan view of the skirt shown in FIG. 8A and FIG. 8B.
Figure 11A:
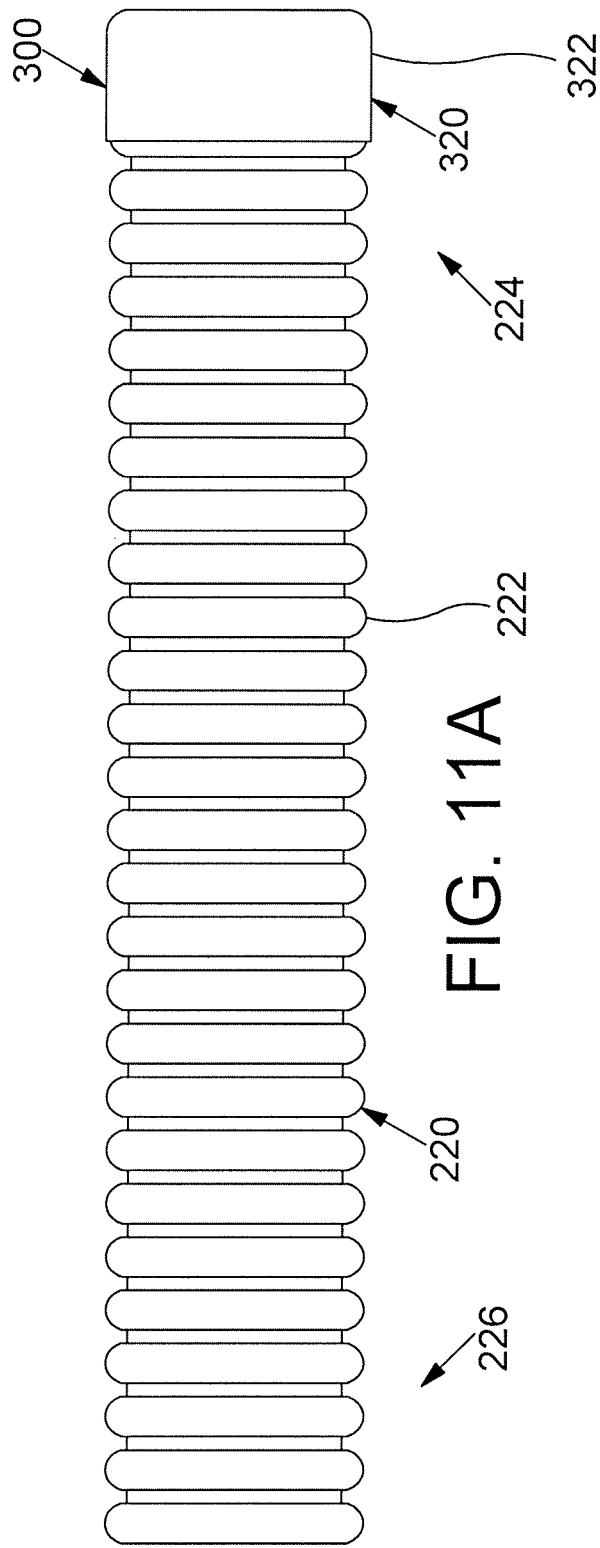
FIG. 11A is a side view of a debris conduit. The debris conduit is assuming a straight shape in the example embodiment of FIG. 11A.
Figure 11B:
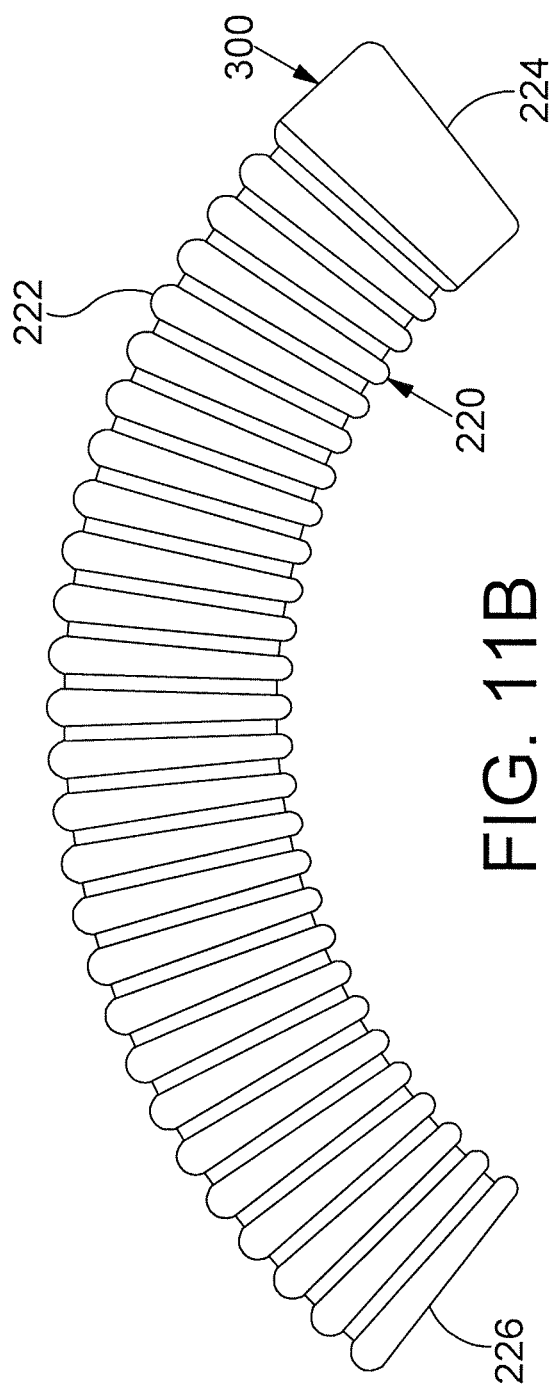
FIG. 11B is a side view of a debris conduit. The debris conduit is assuming a curved shape in the example embodiment of FIG. 11B.
Figure 12:
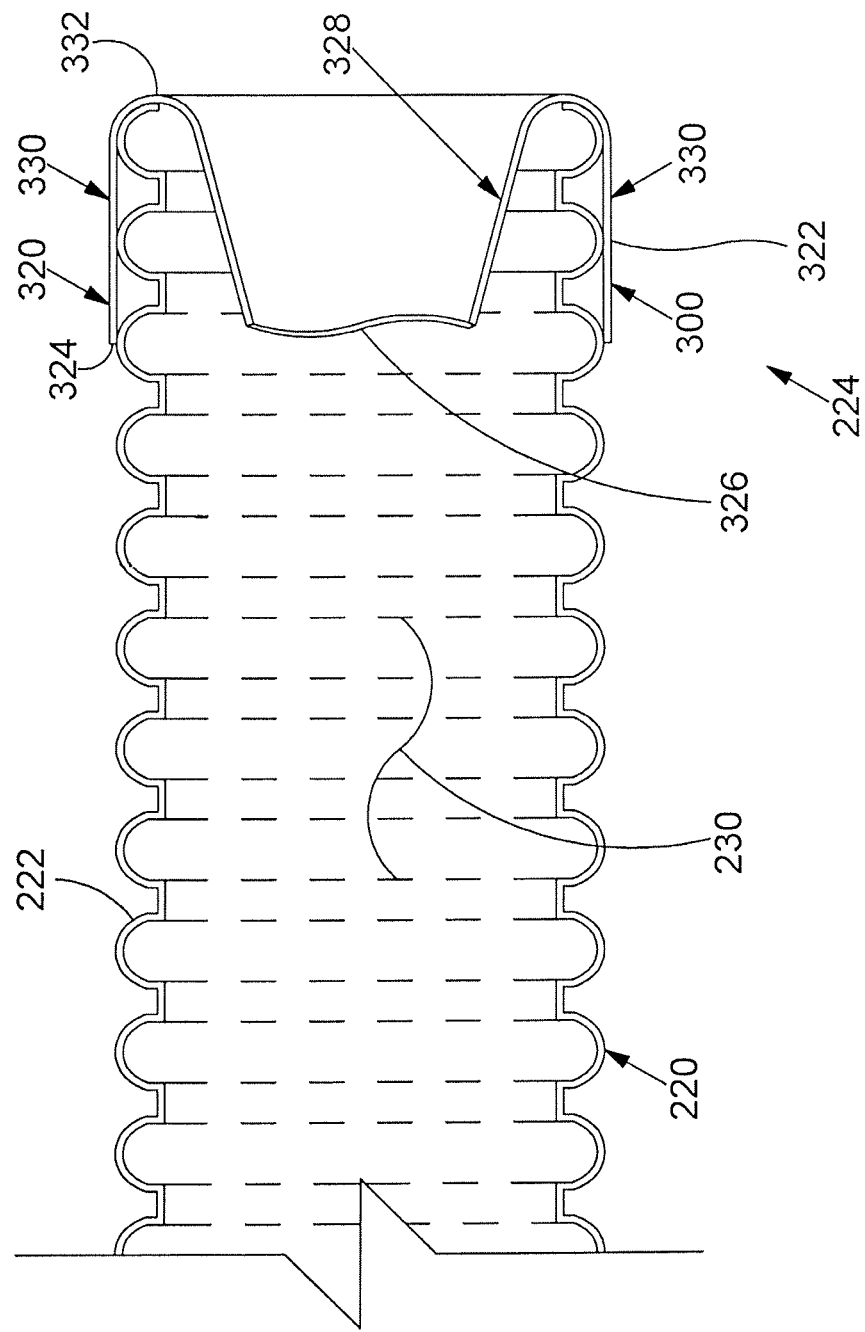
FIG. 12 is an enlarged cross-sectional view showing an upstream portion of the debris conduit shown in FIG. 11A and FIG. 11B.

FIG. 7 is a perspective view showing an illustrative portion of support wire 142 in accordance with this detailed description. With reference to FIG. 7, it will be appreciated that the support wire 142 extends through three mutually orthogonal planes: a first plane xy, a second plane xz, and a third plane yz. First plane xy is defined by an X-axis and a Y-axis. Second plane xz is defined by the X-axis and a Z-axis. Third plane yz is defined by the Y-axis and the Z-axis. The support wire 142 includes a number of turns 146 that wrap loosely about the Z-axis shown in FIG. 7. With reference to FIG. 7, it will be appreciated that the support wire 142 does not lie completely on any one of the three planes shown in FIG. 7 (i.e., first plane xy, second plane xz, and third plane yz). The support wire 142 has a proximal end P, a distal end D, and an intermediate portion that extends between the proximal end and the distal end. With reference to FIG. 7, it will be appreciated that the support wire 142 spirals in a clockwise direction CW as it extends in a distal direction from the proximal end P to the distal end D. However, in other embodiments, the support wire can spiral in the counterclockwise direction CCW as it extends in the distal direction from the proximal end P to the distal end D. In the embodiment of FIG. 7, the support wire 142 has a pitch T. Pitch T may be defined as the distance between the centers of adjacent turns 146 of the support wire 142. In one more embodiments, the pitch T may become smaller as a duct including the support wire 142 is compressed toward a compressed state and the pitch T may become larger as a duct including the support wire 142 is expanded toward an expanded state In the embodiment of FIG. 7, the support wire 142 has a radius R that is substantially constant throughout the rotation of the support wire 142. In the embodiment of FIG. 7, it will be appreciated that the support wire 142 forms a helix. It will also be appreciated, however, that some three dimensionally shaped curves do not form helices. Additionally, it will be appreciated that three dimensionally shaped curves are possible which have a radius that varies through the rotation of the three dimensionally shaped curve unlike the support wire 142 shown in FIG. 7. In the embodiment of FIG. 7, the support wire 142 completes three complete revolutions. Each of these revolutions has an angular span of three hundred and sixty degrees.

Referring to FIG. 14, when the duct 120 has a bellows configuration, it may be readily collapsed with the debris conduit 220, and strips 181 within the interior of the duct and may include instructions 360 and packaging 366. Such kit 370 provides a compact assembly very suitable for retail sales and shipping.

The following United States patents are hereby incorporated by reference herein: U.S. Pat. Nos. 3,945,281, 4,255,995, 4,576,072, 4,934,233, 5,782,153, 5,819,619, 5,931,072, 6,421,040, 6,427,570, 6,470,778, 6,470,778, 6,510,772, 6,742,425, 6,783,563, 6,827,640, 6,935,939, 6,988,435, 7,013,884, 7,204,178, 7,216,572, 7,559,268, 7,654,181, 7,789,003, 7,802,505, 7,980,163, 8,061,044, 8,061,250, 8,069,761, 8,161,858, 8,161,858, 8,272,303, 8,272,304, 8,459,158, 8,459,158, 8,522,656, 8,726,774, 8,869,786, 9,149,951, and 9,221,110.

The above references in all sections of this application are herein incorporated by references in their entirety for all purposes. Components illustrated in such patents may be utilized with embodiments herein. Incorporation by reference is discussed, for example, in MPEP section 21630.07 (B).

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

I claim:

1. A debris collection apparatus for use with a bucket and a power saw so that debris generated by the power saw is collected in the bucket, the power saw including a rotating sawblade and a discharge port positioned proximate the rotating sawblade, the apparatus comprising:
   a duct having a duct wall extending between an upstream edge and a downstream edge, the duct wall having an inner surface defining a duct lumen, the duct having an axially collapsed shape and an axially extended shape, the duct being repeatedly extendable from the axially collapsed shape to the axially extended shape for use with the power saw, the duct also being repeatedly collapsible from the axially extended shape to the axially collapsed shape for transportation or storage, the duct having a first length while assuming the axially collapsed shape and a second length while assuming the axially extended shape, the second length being greater than four feet and the first length being less than four inches, wherein the downstream edge of the duct defines a downstream opening fluidly communicating with the duct lumen;
   a skirt extending from a rearward edge coupled to the duct to a forward edge defining a plurality of flaps configured to couple the skirt to the saw, wherein the skirt is configured to collect debris in the duct lumen; and
   a debris conduit configured to be received within at least a portion of the duct lumen and comprising a conduit wall extending between an upstream end and a downstream end, the conduit wall defining a debris channel, wherein the upstream end of the debris conduit is configured to attach to the discharge port of the power saw and extends longitudinally into the portion of the duct lumen,
   wherein, when the skirt is attached at the power saw and the upstream end of the debris conduit is connected to the discharge port of the power saw, debris thrown by the rotating sawblade passes through the duct lumen and the debris channel.

2. The apparatus of claim 1, wherein an inner diameter of the duct is between about 10 inches and about 14 inches.

3. The debris collection apparatus of claim 1, wherein the duct has a collapsible bellows configuration.

4. The debris collection apparatus of claim 1, wherein the duct wall comprises an inner sleeve, a support wire disposed about the inner sleeve, and an outer sleeve disposed about both the support wire and the inner sleeve so that the support wire is disposed between the inner sleeve and the outer sleeve, the support wire forming a plurality of turns, each turn encircling the inner sleeve.

5. The debris collection apparatus of claim 4, wherein the duct comprises plastic.

6. The debris collection apparatus of claim 1, in combination with a miter or chop saw and whereby when the duct is attached to the saw the duct extends horizontally and then substantially vertically by gravity.

7. The apparatus of claim 1, wherein the rearward edge of the skirt is disposed about the upstream edge of the duct.

8. The apparatus of claim 1, wherein each flap of the plurality of flaps define a plurality of holes configured to coupled the skirt to the saw.

9. The apparatus of claim 1, wherein, as debris thrown by the rotating sawblade passes through the duct lumen and the debris channel, the skirt is further configured to enable discharge air from the saw discharge to slowly rise and exit the duct lumen.

10. A kit for use with a bucket and a miter or chop saw mounted on a stand so that debris generated by the miter or chop saw is collected in the bucket, the miter or chop saw including a saw head with a rotating sawblade, the saw head pivotal about a horizontal axis, and a discharge port positioned proximate the rotating sawblade, the kit comprising:
a duct with an upstream edge in an axially collapsed shape, a skirt extending from a rearward edge coupled to the duct to a forward edge defining a plurality of flaps, a debris conduit, and instructions for attaching the duct and the debris conduit to the miter or chop saw, wherein each of the duct, the debris conduit, and the instructions are retained by or contained in a packaging;
wherein the duct having a downstream edge and a duct wall extending between the upstream edge and the downstream edge, the duct wall having an inner surface defining a duct lumen;
wherein the duct, when removed from in the packaging, is configured to have an axially extended shape, the duct being repeatedly extendable from the axially collapsed shape to the axially extended shape for use with the miter or chop saw, the duct also being repeatedly collapsible from the axially extended shape to the axially collapsed shape for transportation or storage, the duct having a first length in the axially collapsed shape and a second length when extended to the axially extended shape, the second length being greater than the first length;
wherein the duct wall comprises an inner sleeve, a support wire disposed about the inner sleeve, and an outer sleeve disposed about both the support wire and the inner sleeve so that the support wire is disposed between the inner sleeve and the outer sleeve, the support wire forming a plurality of turns, each turn encircling the inner sleeve;
wherein the downstream edge of the duct defines a downstream opening for use with a five gallon bucket;
wherein the debris conduit having an upstream end and a downstream end, the debris conduit comprising a conduit wall extending between the upstream end and the downstream end, the conduit wall defining a debris channel, and wherein the debris conduit is configured to be received within at least a portion of the duct lumen; and
wherein the plurality of flaps are configured to couple the skirt to the miter or chop saw, and wherein, when attached to the miter or chop saw, the skirt is configured to collect debris in the duct lumen and the duct lumen and the debris channel are configured to receive debris thrown by the rotating sawblade.

11. The kit of claim 10, further comprising a retaining element for detachably attaching the upstream end of the debris conduit to the discharge port of the power saw.

12. The kit of claim 11, wherein, when the elastic upstream skirt is attached to the power saw and the upstream end of the debris conduit is connected to the discharge port of the power saw, debris thrown by the rotating sawblade passes through the debris channel and the debris lumen and falls into the five gallon bucket.

13. The kit of claim 10, wherein the duct has a collapsible bellows configuration.

14. The kit of claim 10, wherein the duct comprise plastic.

15. The kit of claim 10, wherein the rearward edge of the skirt is disposed about the upstream edge of the duct.

16. The kit of claim 10, wherein each flap of the plurality of flaps define a plurality of holes configured to coupled the skirt to the saw.

17. A debris collection apparatus for a saw mounted on a stand, the stand elevating the saw above floor level 2 to 4 feet, the saw having a saw head that is pivotal upwardly and downwardly manually about a horizontal axis for sawing boards, the saw having a rearward debris discharge port, the apparatus comprising:
an axially collapsible main duct with a diameter of 8 inches to 20 inches, the axially collapsible main duct having a bellows configuration, the axially collapsible main duct having a collapsed length and an extended length that is at least 10 times the collapsed length;
a skirt extending from a rearward edge coupled to the collapsible main duct to a forward edge defining a plurality of flaps configured to couple the skirt to the saw, wherein the skirt is configured to collect debris in a duct lumen of the collapsible main; and
a debris conduit for insertion within the collapsible main duct, the debris conduit for connection to the rearward debris discharge port when the collapsible main duct is attached to the saw, whereby when the collapsible main duct is attached to the saw, the debris conduit is positioned within and extends longitudinally into the portion of the duct lumen, the debris conduit having a conduit wall extending between an upstream end and a downstream end, the conduit wall defining a debris channel for sawdust, the debris conduit having a diameter of from 1 ½ inches to 4 inches,
wherein, when the elastic upstream skirt is attached at the saw and the upstream end of the debris conduit is connected to the discharge port of the power saw, debris thrown by the rotating sawblade passes through the duct lumen and the debris channel.

18. The debris collection apparatus of claim 17, in combination with a saw and a debris collection receptacle, the main duct attached to the saw and the majority of the main duct extending substantially vertically and position over the receptacle.

19. The debris collection apparatus of claim 17, wherein the rearward edge of the skirt is disposed about the an upstream edge of the collapsible main duct.

20. The debris collection apparatus of claim 17, wherein each flap of the plurality of flaps define a plurality of holes configured to coupled the skirt to the saw.

\* \* \* \* \*